No. 793,784. PATENTED JULY 4, 1905.
F. N. HACKETT.
CURRYCOMB.
APPLICATION FILED FEB. 13, 1905.
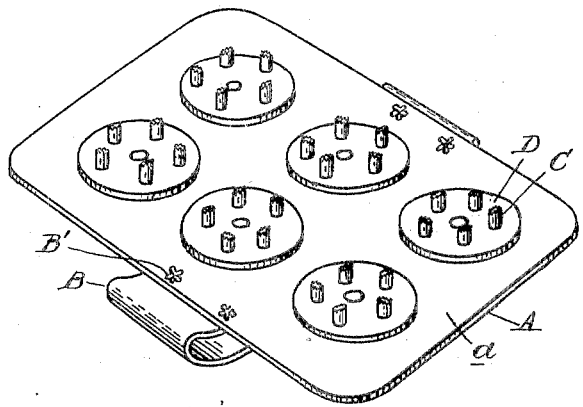
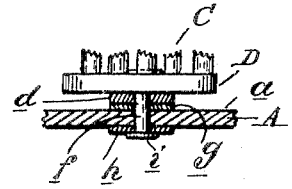
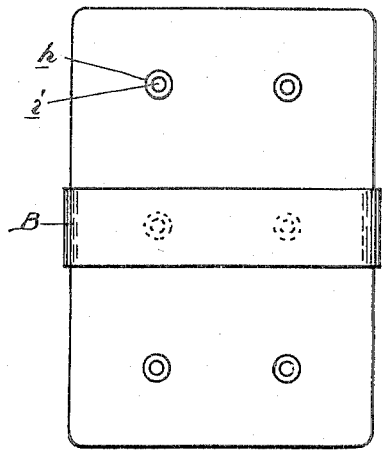
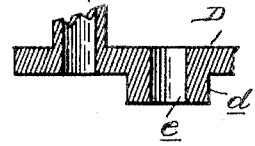
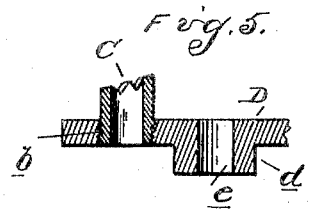
Witnesses
A. L. Hobby
Edward D. Ault
Inventor
Fred N. Hackett
By James Whittemore
atty.

No. 793,784. Patented July 4, 1905.

UNITED STATES PATENT OFFICE.

FRED N. HACKETT, OF DETROIT, MICHIGAN.

CURRYCOMB.

SPECIFICATION forming part of Letters Patent No. 793,784, dated July 4, 1905.

Application filed February 13, 1905. Serial No. 245,488.

*To all whom it may concern:*

Be it known that I, FRED N. HACKETT, a citizen of the United States, residing at Detroit, in the county of Wayne and State of Michigan, have invented certain new and useful Improvements in Currycombs, of which the following is a specification, reference being had therein to the accompanying drawings.

The invention relates to a novel type of currycomb wherein the teeth are adapted to receive the dirt removed from the coat of the animal and are so applied to the comb back or body that the dirt will pass readily through and out, thus preventing clogging, while the body in turn serves as a guard or shield protecting the hand and sleeve of the operator.

The invention consists in the peculiar and simple construction of the currycomb and, further, in the novel arrangement and combination of its various parts, as hereinafter set forth.

In the drawings illustrating my invention, Figure 1 is a bottom view in perspective of the currycomb. Fig. 2 is a top plan view thereof; Fig. 3, a detached sectional view showing the manner of connecting the teeth to the comb-body; Fig. 4, an enlarged sectional view illustrating the peculiar construction of the teeth and the manner of applying to their support, and Fig. 5 is a modification.

In the drawings thus briefly described the reference-letter A designates the comb-body, consisting in this instance of a flat piece of leather sufficiently pliable to enable the operator to curve or bend the same in his hand when using in order to conform to the contour of the animal to be cleaned. Upon the comb-back is attached the usual hand-strap B, which may be secured to the comb in any suitable manner, preferably by rivets B'. Upon the face $a$ of the body are arranged the teeth, preferably of tubular construction and so applied that a space will be left between their inner ends to permit the dirt to pass through the teeth and out between the ends and the comb-face.

Various types of connection may be employed between the teeth and the comb to give the results desired, and while I have shown a preferred form of connection which I deem preferable in use I do not desire to be limited to the same. As shown in the drawings, the teeth designated by the reference-letter C are arranged upon the comb-face in groups, preferably five in number, and a support D, in this instance in the form of a disk, is provided for each group, the disks in turn being preferably pivoted to the body, so that a rotary movement will be given to the teeth in the operation of currying. The disks, as shown, are provided with a plurality of openings, as $b$, and the tubular teeth may be fitted within the openings in the manner indicated in Fig. 5 or they may be cast upon the supports or disks in the manner shown in Fig. 4, the openings in the teeth in this instance extending through the disk to permit of the passage of the dirt therethrough.

The disks are spaced from the face of the body by means of a boss $d$ in each instance, the boss being apertured, as at $e$, and a rivet $f$, extending through the boss and through the body, serves as a connection between the parts. To permit the ready rotation of the disks, washers $g$ $h$ are interposed, respectively, between the boss and face $a$ and between the back and the rivet-head $i$, as indicated in Fig. 3.

As shown in Fig. 1, the teeth are arranged in circles upon their supports, their extremities are beveled in the manner indicated in Fig. 4, and the edges serrated, so that they will properly engage the coat of the animal and serve to effectively remove the dirt.

It will be obvious from the construction of comb described that while the dirt may readily pass through the hollow teeth it will not clog therein, while the face of the comb-body serves as a shield to prevent the dirt from reaching the hand and sleeve of the user. It will be further noticed that by reason of the pivotal connection between the groups of teeth and the body a slight rotary movement will be imparted to the teeth as the comb is moved over the body of the animal, which movement causes the dirt to be dislodged from the serrated edges of the teeth and clogging at this point prevented.

Having thus described my invention, what I claim, and desire to secure by Letters Patent, is—

1. A currycomb, comprising a body, a plurality of hollow open-ended teeth therefor adapted to receive the dirt removed from the animal's coat, and connections between the body and teeth permitting the discharge through the latter in the direction of the body of accumulated dirt.

2. A currycomb consisting of a body and a plurality of hollow open-ended teeth therefor spaced from the body-face.

3. A currycomb, comprising a body, a plurality of tubular teeth therefor arranged in groups, and a support for each group having pivotal connections with the body.

4. A currycomb, comprising a body, supporting members upon and spaced from the body-face, each support having a number of openings extending therethrough, and a plurality of hollow open-ended teeth upon each support corresponding in number to and registering with the support-openings.

5. In a currycomb, the combination with the body, of a plurality of apertured disks pivoted upon the body-face and spaced therefrom, and tubular teeth upon said disks registering with the disk-apertures, the ends of the teeth being beveled and the edges serrated, substantially as described.

In testimony whereof I affix my signature in presence of two witnesses.

FRED N. HACKETT.

Witnesses:
EDWARD D. AULT,
JAS. P. BARRY.